Dec. 22, 1964　　　G. S. CHERNIAK　　　3,162,795
POSITIONING SYSTEM EMPLOYING A TRANSDUCING DEVICE
HAVING AN INTEGRAL TORQUE GENERATOR
Filed Jan. 11, 1962　　　　　　　　　　　2 Sheets-Sheet 1

INVENTOR.
GEORGE S. CHERNIAK
BY
ATTORNEYS

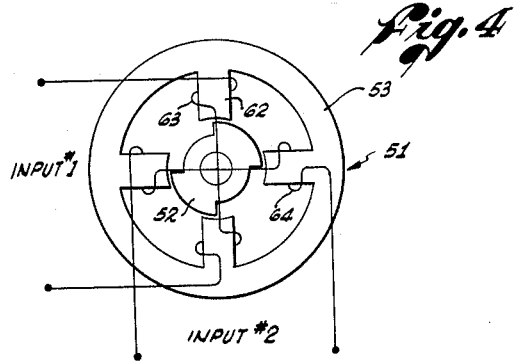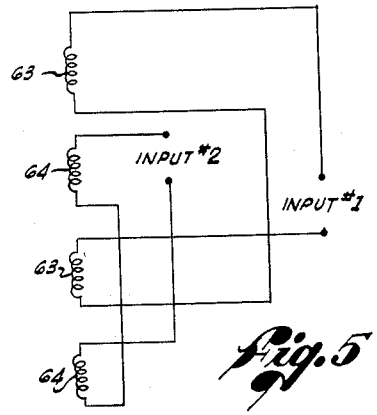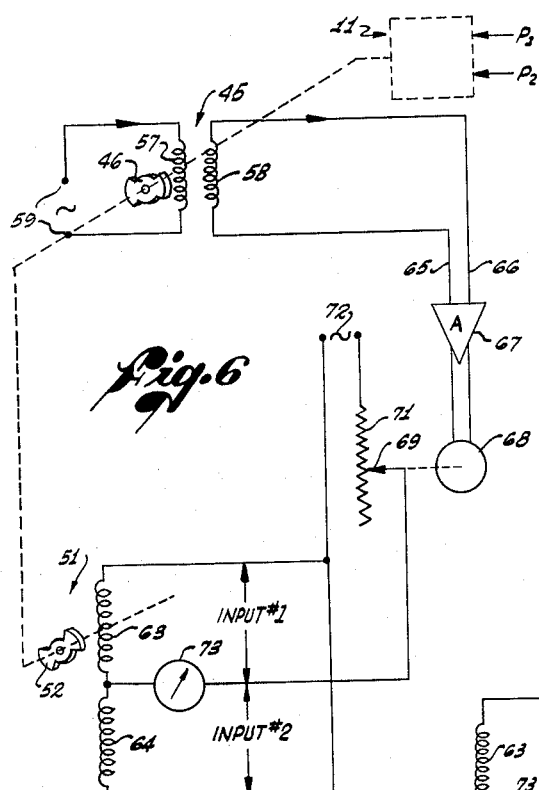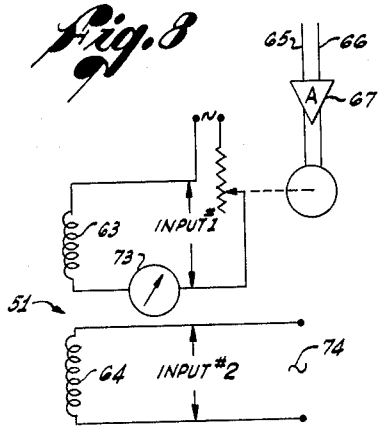
Fig. 4
Fig. 5
Fig. 6
Fig. 7
Fig. 8
INVENTOR.
GEORGE S. CHERNIAK
ATTORNEYS

United States Patent Office 3,162,795
Patented Dec. 22, 1964

3,162,795
POSITIONING SYSTEM EMPLOYING A TRANSDUCING DEVICE HAVING AN INTEGRAL TORQUE GENERATOR
George S. Cherniak, Eau Gallie, Fla.
(522 Andros Lane, Indian Harbor Beach, Fla.)
Filed Jan. 11, 1962, Ser. No. 165,509
9 Claims. (Cl. 318—32)

This invention relates generally to transducing devices for converting mechanical movements, forces, and pressures to representative electrical quantities; and more particularly to transducing devices in which such electrical quantities are a measure of the energization of a torque generator applying a restoring torque to an elastic element of a transducing device.

According to my prior Patent 2,909,739, granted October 20, 1959, for Transducing Devices, a transducing device is disclosed in which translatory or linear movement applied axially to a helical spring, one end of which in held against rotation, is converted into angular rotation of the opposite end of the spring. This rotation varies the position of the rotor of a rotary differential transformer to produce an output signal from the transformer stator winding proportional to the force applied to and the displacement of the axially movable end of the spring.

According to the present invention, the elastic element of a transducer, specifically the spring of my prior patent above identified, is connected to the rotor of a torque generator which applies a restoring torque to balance the input torque on the elastic element. This balance may be either at the null point of the pickoff transformer, where the torque generator is energized from an exterior source; or may be at an intermediate position, where the torque generator is energized directly from the output of the pickoff transformer.

The torque generator is provided with a pair of input windings and produces an output torque which is substantially linearly proportional to the product of the currents in the two input windings. If the currents in the input windings are made to be equal at all times, then the torque output will be linearly proportional to the square of the current and the current readout will be proportional to the square root of the force applied to the elastic element of the transducer. On the other hand, where one winding of the torque generator is given a constant energization, the current input to the other winding to produce a balanced condition will be directly proportional to the applied force.

In many measuring systems, such as flow meters, altimeters, and related devices, a readout or signal is desired which is proportional to the square root of the applied force; for example, that resulting from the pressure difference between two points in a flow system in flow velocity measurements. The use of the torque generator with equal current energization in its input windings is particularly advantageous in giving a readout which is proportional to the square root of the applied force or pressure difference.

A further feature of the present invention is in the configuration of the spring forming the elastic element of the transducer, the single helical spring of my prior patent being replaced by a composite spring including two helices of opposite sense. The opposite ends of the composite spring are both maintained against rotation, while permitting relative axial movement therebetween. The junction of the helices has an angular displacement resulting from such relative axial end movement. This construction gives many mechanical design advantages by providing a symmetrical instrument in which accelerating forces are balanced out and thermal effects are minimized.

It is, therefore, an object of the present invention to provide an improved transducing device employing a torque generator energized to apply a restoring torque directly to the elastic element of the transducing device.

Another object of this invention is to provide an improved transducing device for converting linear movements into angular displacements with symmetrical aspects minimizing accelerating forces and thermal effects.

Another object of this invention is the provision of an improved transducing device employing an integral torque generator applying a restoring force to the elastic element of the device and giving an electrical readout proportional to the square root of the force applied to the elastic element.

A further object of this invention is the provision of an improved transducing device employing an integral torque generator applying a restoring torque directly to the elastic element of the device and giving an electrical readout directly proportional to the force applied to the elastic element.

Yet another object of this invention is the provision of an improved differential pressure transducer system having an element subject to angular displacement proportional to the pressure differential with a pair of rotors, one of which cooperates with the stator of a rotary differential transformer to give a pickoff signal, and the other of which cooperates with the stator of a torque generator to apply a restoring torque to the rotary element, in which the torque generator is energized in accordance with the signal from the pickoff transformer to balance the torque applied to the rotary element by the differential pressure.

These and other objects and features of the invention will be readily apparent to those skilled in the art from the following specification and the appended drawings, in which:

FIGURE 4 is a diagrammatic representation of the torque generator for the transducer of FIGURE 1;

FIGURE 5 is a diagrammatic representation of the interconnection of the input windings for the stator poles of the torque generator of FIGURE 4;

FIGURE 6 is a diagrammatic representation of the transducer of FIGURE 1, including the electrical connections for energizing the torque generator in accordance with the signal from the pickoff transformer to return the rotor of the transformer to its null point;

FIGURE 7 is a diagrammatic showing of a portion of FIGURE 6, but with the torque generator energized directly from the amplified output of the pickoff transformer so that balance is effected at an intermediate position out of the null position; and FIGURE 8 is a partial diagrammatic representation of a modified energizing connection for the torque generator to secure a signal proportional to the applied force of pressure difference.

Figure 1:
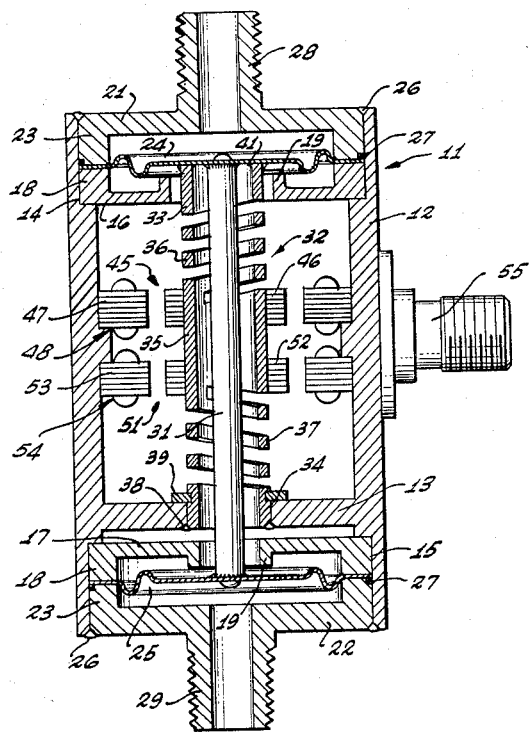
FIGURE 1 is a longitudinal sectional view through a differential pressure transducer according to the present invention.

As specifically illustrated in FIGURE 1, a form of transducer 11 according to the present invention is provided with a cylindrical casing 12 provided with an interior annular supporting ring 13 integral therewith. The opposite ends of the casing 12 are provided with counterbores 14 and 15 in which are disposed annular members 16 and 17, respectively, provided with inner and outer circular flanges 18 and 19. At the opposite ends of the casing 12 are mounted generally cupshaped members 21 and 22 provided with outer annular flanges 23. Between the flanges 18 on the annular members 16 and 17, and the flanges 23 on the cupshaped members 21 and 22, are mounted flexible diaphragms 24 and 25. The cupshaped members 21 and 22 tightly press the diaphragms 24 and 25 and the outer flanges 18 on the annular members 16 and 17 against the ends of the counterbores 14 and 15, and the assemblage is rigidly held together by welding or brazing as at 26. Sealing rings 27 are provided to prevent leakage of gas or other fluid out of the chambers provided between the diaphragms 24–25 and the cupshaped end members 21–22, respectively. Fluid coupling nipples 28 and 29 integral with the members 21 and 22, respectively, provide fluid access into the aforesaid chambers. A rod 31 is rigidly secured at its opposite ends to the diaphragms 24 and 25 at the centers thereof, as by brazing, welding, or riveting, and positively constrains the diaphragms for movement in unison. The flanges 19 limit the extremes of movement of the diaphragms to prevent injury thereto.

The composite spring forming the elastic element of the transducer of FIGURE 1 is indicated generally at 32, and includes upper and lower cylindrical end portions 33 and 34, respectively, and a center cylindrical portion 35. Between the upper end portion 33 and the center portion 35 is disposed an integral helical spring portion 36 having its helix directed in one direction; and connecting the lower end portion 34 and the center portion 35 is a second integral helical spring portion 37 having its helix directed oppositely to the direction of the helix 36. The end 34 of spring 32 is rigidly connected to the support 13, as by brazing or welding at 38, and is provided with a constructional snap ring 39 holding the end 34 in position relative to the ring 13 prior to the brazing operation. The upper end 33 of the spring 32 is rigidly connected to the diaphragm 24, as by brazing or welding at 41.

The spring 32 is therefore prevented from rotating at its opposite ends by the connection of end 34 to the supporting ring 13, and of end 33 to the diaphragm 24. The center portion 35 of the spring 32 is free to rotate in the manner described in my prior patent above identified, and it will be noted that the helices 36 and 37, although extending in the opposite sense, operate in the same rotational direction to effect angular displacement of the center portion 35 upon relative axial movement between the ends 33 and 34 of the spring.

The rotary differential transformer is indicated generally at 45, and includes a rotor 46 rigidly mounted on the center portion 35 of the spring 32, a magnetic stator 47, and polar windings indicated generally at 48. The torque generator is indicated generally at 51, and includes a rotor 52 rigidly mounted on the center portion 35 of the spring 32, a magnetic stator 53, and polar windings indicated generally at 54. An electrical connection means 55 provides for connection through the casing 12 to the windings 48 and 54.

Figure 2:
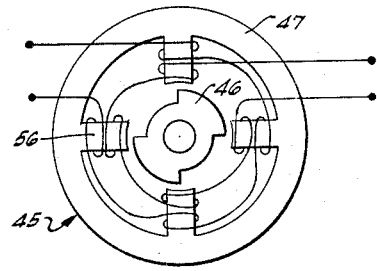
FIGURE 2 is a diagrammatic representation of the rotary differential transformer supplying the pickoff signal.
Figure 3:
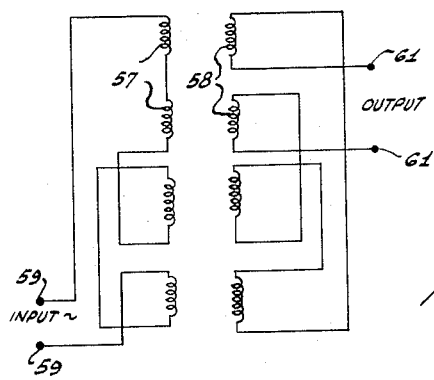
FIGURE 3 is a diagrammatic representation of the interconnection of the windings of the separate poles of the differential transformer of FIGURE 2.

The rotary differential transformer supplying the pickoff signal is indicated diagrammatically in FIGURES 2 and 3. The magnetic stator is shown as having four symmetrically disposed poles 56 within which is disposed the rotor 46 and upon which are wound the windings 48. Each of the poles 56 has thereon an input winding 57 and an output winding 58, with the windings interconnected as shown in FIGURE 3, in which an alternating current source is indicated as applied to the input 59. When the rotor 46 is in its null position, no signal appears across the output 61; and when the rotor 46 is out of null position, an alternating current signal appears across the output 61, and its magnitude will be determined by the amount of the angular displacement of the rotor and its phase by the direction in which the displacement occurs. The operation of such rotary differential transformers to supply a pickoff signal is well known in the art.

The torque generator 51 is diagrammatically illustrated in FIGURES 4 and 5 with its magnetic stator including four symmetrically disposed poles 62, on opposite ones of which are wound the input portions 63 and 64 of the winding 54. The structure and operation of the torque generator 51 are also well known in the art, the torque exerted by its rotor 52 being proportional to the product of the currents through the windings 63 and 64, and where the currents are maintained equal will be proportional to the square of the current.

The schematic diagram of FIGURE 6 shows the transducer 11 with a pressure $P_1$ applied, for example, through the nipple 28; and a pressure $P_2$ applied through the nipple 29. The pressure $P_1$ will therefore be applied to the upper surface of the diaphragm 24 to exert a force thereon in the downward direction; and the pressure $P_2$ will be exerted on the lower surface of the diaphragm 25 to exert a force thereon in the upward direction. Since the diaphragms 24 and 25 are connected together by the rod 31, the net movement of the diaphragms will be proportional to the difference between the pressures $P_1$ and $P_2$ and will be applied to the upper end 33 of the spring 32. The axial movement of the end 33 of the spring 32 produced by this differential force causes rotation of the central portion 35 of the spring 32, as explained more fully in my above-identified Patent 2,909,739. This rotation of the center portion 35 of the spring rotates the rotor 46 of the differential transformer 45 to displace it angularly from its null point and produce a signal voltage in the output winding 58 of the transformer.

The output voltage is fed through lines 65 and 66 and an amplifier 67 to a motor 68. The motor 68 drives the slider 69 of a potentiometer 71 to vary the magnitude of the energization of the torque generator 51 from an alternating source 72. The source 72 feeds the two input windings 63 and 64 of the torque generator 51 through the potentiometer 71 to exert a torque upon the center portion 35 of the spring 32 through the torque generator rotor 52 which is rigidly connected thereto. The torque generator is connected to oppose the displacement of the center portion 35 of the spring 32 and to return the rotor 46 towards its null point. When the null point is reached, the signal from the output winding 58 becomes zero, the motor 68 ceases to rotate, and the center portion 35 of the spring 32 will have been returned to its neutral position corresponding to the null point of the rotor 46. The currents passing through the windings 63 and 64 may be measured by an ammeter 73 whose readout is proportional to the square root of the difference between $P_1$ and $P_2$; and if these represent pressures on opposite sides of an orifice in a flow system, the instrument 73 may be calibrated directly in flow velocity.

After balance, any change in the difference between $P_1$ and $P_2$ will be accompanied by an angular displacement of the rotor 46 to produce a signal in the output winding 58 of the rotary differential transformer 45 which will produce a rotation of the motor 68 in the proper direction to change the energization of the torque generator 51 to again compensate for the torque exerted on the center portion of spring 32 by the axial force thereon. This compensation always returns the rotor 46 to its null point where no signal appears across the output winding 58.

In the system of FIGURE 7, the output of the winding 58 is fed through lines 65 and 66 and amplifier 67 directly to the input windings 63 and 64 of the torque generator 51. In this arrangement, the rotor 46 will not return to its null point, since the winding 58 must give a continuous signal sufficient, when amplified, to energized the torque generator to balance the torque exerted by the axial force applied to the spring 32. Therefore, a balancing point will be automatically selected by the instrument where the angular torque on the center of spring 32 due to the pressure difference is equalled and balanced by the torque generated by the torque generator, at a finite signal magnitude from the winding 58. Accordingly, the response of the instrument 73 will no longer be truly linear with respect to the square root of the pressure difference, and the instrument will require calibration to a nonlinear scale.

The arrangement of FIGURE 6 gives a substantially true linear readout by the instrument 73 proportional to the square root of $P_1$ minus $P_2$, and is more accurate than the direct energization arrangement of FIGURE 7. However, the arrangement of FIGURE 7 may have advantages of improved resolution over certain pressure ranges.

In the arrangement of FIGURE 8, input #2 of the torque generator 51 is energized with a constant excitation from a source 74, and only input #1 is energized in accordance with the signal from the output winding 58. The current through instrument 73 is no longer proportional to the square root of $P_1$ minus $P_2$, but is substantially linear with respect to the difference itself. The single input winding energization of FIGURE 8 may also be accomplished in accordance with the direct energization arrangement of FIGURE 7 where desired.

While a torque generator transducing device according to the present invention has been specifically illustrated and described in connection with the composite spring transducer of FIGURE 1, it is understood that the torque balancing arrangement will work as well with the single spring transducer of my prior Patent 2,909,739 and with other transducers generally, which employ an elastic responsive element to which a restoring torque may be applied. Also, while the composite spring transducer of FIGURE 1 has been specifically illustrated with a torque generator, it will be understood that this construction is equally applicable to a transducer supplying only a pick-off signal without a restoring torque; and that the composite spring transducer and the torque generator transducer, separately and combined, are not limited to the measurement of differential pressures, but are generally applicable to the measurement of forces or displacements applied to the elastic element of the transducer—for example, in accordance with the disclosures of the responsive means of FIGURES 1, 4, and 5 of my prior Patent 2,909,739.

While certain preferred embodiments of my invention have been specifically illustrated and described, it will be understood that the invention is not limited thereto, as many variations will be apparent to those skilled in the art, and the invention is to be given its broadest interpretation within the terms of the following claims.

I claim:

1. A transducing device comprising: a helical spring member mounted for relative axial movement between its ends with a part thereof restrained against rotative movement; a movable element for effecting relative axial movement between the ends of said spring member; an electrical signal generator having a stationary part, and a rotary part mounted on another part of said spring member; a torque generator having a stationary part, and a rotary part mounted on said other part of said spring member; and a circuit electrically coupling said torque generator to said signal generator to oppose rotation thereof.

2. A transducing device comprising: a helical spring member mounted for relative axial movement between its ends with a part thereof restrained against rotative movement; a movable element for effecting relative axial movement between the ends of said spring member; an electrical signal generator having a stationary part, and a rotary part mounted on another part of said spring member; a torque generator having a stationary part, and a rotary part mounted on said other part of said spring member, said torque generator including a pair of input windings mounted in quadrature; a variable voltage source for energizing said torque generator windings with equal currents; and a motor whose energization is controlled by said signal generator to vary the voltage from said source.

3. A transducing device comprising: a helical spring member mounted for relative axial movement between its ends with a part thereof restrained against rotative movement; a movable element for effecting relative axial movement between the ends of said spring member; an electrical signal generator having a stationary part, and a rotary part mounted on another part of said spring member; a torque generator having a stationary part, and a rotary part mounted on said other part of said spring member, said torque generator including a pair of input windings mounted in quadrature; a constant voltage source for energizing one winding of said torque generator; a variable voltage source for energizing the other input winding of the torque generator; and a motor whose energization is controlled by such signal generator to vary the voltage from said variable voltage source.

4. A transducing device comprising: a helical spring member for relative axial movement between its ends with a part thereof restrained against rotative movement; a movable element for effecting relative axial movement between the ends of said spring member; a pair of magnetic rotors mounted on another part of said spring member; a magnetic stator for each of said magnetic rotors; an input winding on one of said stators; an alternating current source to energize said input winding; an output winding on said one stator; a pair of input windings for the second stator; and an amplifier intercoupling said output winding with said pair of input windings.

5. A transducing device comprising: a spring member formed with a pair of helices of opposite sense directed towards the central portion of the spring member; a mounting at both ends of the spring member restraining said ends against rotation while providing for relative axial movement therebetween, said mounting including at least one movable element for effecting relative axial movement between the ends of said spring member; an electrical signal generator having a stationary part, and a rotary part mounted on the central portion of said spring member; a torque generator having a stationary part, and a rotary part mounted on the central portion of said spring member; and a circuit electrically coupling said torque generator to said signal generator to oppose rotation thereof.

6. A pressure transducing device comprising: a pair of oppositely directed diaphragm chambers; means interconnecting the diaphragms of said chambers for common movement; means for independently introducing the pressures whose difference is to be measured into said diaphragm chambers; a helical spring member having one end thereof constrained against rotation and the other end attached to one of said diaphragms; a pair of magnetic rotors mounted on a part of said spring member; a signal generator stator cooperating with one of said magnetic rotors and having an output winding; a torque generator stator cooperating with the other of said magnetic rotors and having an input winding; and an electric circuit intercoupling said input and output windings.

7. A differential pressure transducing device comprising: a pair of oppositely directed diaphragm chambers; means for independently supplying pressures whose difference is to be measured to said diaphrgam chambers; means interconnecting the diaphragms of said chambers for common movement; a double helical spring member having helices of opposite sense directed from its opposite ends toward the central portion thereof; means mounting one end of said spring member to a fixed part; means attaching the opposite end of said spring member to one of said diaphragms; a signal generator having a stationary part, and a rotary part mounted on the central portion of said spring member; a torque generator having a stationary part, and a rotary part mounted on the central portion of said spring member and a circuit electrically coupling said torque generator to said signal generator.

8. A transducing device as defined in claim 7 in which said torque generator has a pair of input windings mounted in quadrature and energized with equal currents whose value is controlled by the signal from said signal generator.

9. A transducing device as defined in claim 7 in which said torque generator has a pair of input windings mounted in quadrature, one of which is energized from a constant energy source and the other of which is energized with a current whose value is controlled by the signal from said signal generator.

References Cited by the Examiner
UNITED STATES PATENTS

| | | | |
|---|---|---|---|
| 2,748,355 | 5/56 | Jarvis | 336—30 |
| 2,788,665 | 4/57 | Wiancko | 336—30 XR |
| 2,882,503 | 4/59 | Huff | 336—30 |
| 2,909,739 | 10/59 | Cherniak | 336—30 |
| 2,930,010 | 3/60 | Swainson | 336—30 |
| 2,934,689 | 4/60 | D'Amico | 336—30 XR |

JOHN F. COUCH, *Primary Examiner.*

JOHN F. BURNS, *Examiner.*